(12) United States Patent
Iheagwara (10) Patent No.: US 9,418,228 B2
(45) Date of Patent: Aug. 16, 2016

(54) INFORMATION TECHNOLOGY ENTERPRISE INTRUSION PREVENTION IMPLEMENTATION TOOL

(71) Applicant: Charles M. Iheagwara, Upper Marlboro, MD (US)

(72) Inventor: Charles M. Iheagwara, Upper Marlboro, MD (US)

( * ) Notice: Subject to any disclaimer, the term of this patent is extended or adjusted under 35 U.S.C. 154(b) by 0 days.

(21) Appl. No.: 14/574,976

(22) Filed: Dec. 18, 2014

(65) Prior Publication Data

US 2015/0286822 A1 Oct. 8, 2015

Related U.S. Application Data

(60) Provisional application No. 61/917,427, filed on Dec. 18, 2013.

(51) Int. Cl.
| | |
|---|---|
| *G06F 11/00* | (2006.01) |
| *G06F 12/14* | (2006.01) |
| *G08B 23/00* | (2006.01) |
| *G06F 21/56* | (2013.01) |
| *G06F 21/62* | (2013.01) |

(52) U.S. Cl.
CPC .......... *G06F 21/567* (2013.01); *G06F 21/6272* (2013.01); *G06F 2221/034* (2013.01); *G06F 2221/2117* (2013.01)

(58) Field of Classification Search
CPC ............ H04L 63/1416; H04L 63/1408; H04L 63/1441; H04L 63/1458
USPC ................. 713/153–154, 187–188, 193–194; 726/1, 13, 22–33; 709/206, 249, 389
See application file for complete search history.

(56) References Cited

U.S. PATENT DOCUMENTS

| | | | |
|---|---|---|---|
| 8,959,643 B1 * | 2/2015 | Invernizzi | ........... H04L 63/1425 713/187 |
| 2009/0210507 A1 * | 8/2009 | Haverkos | ................ H04L 51/12 709/206 |

* cited by examiner

*Primary Examiner* — Evans Desrosiers
(74) *Attorney, Agent, or Firm* — Gianna J. Arnold; Brian R. Landry; Saul Ewing LLP (57) ABSTRACT

The software application for implementing intrusion prevention devices of the present invention has an information flow schema, mathematical calculation algorithm and a Web portal. The devices have built-in intelligence, which is used to match user's implementation requirements.

1 Claim, 6 Drawing Sheets

WEIGHTED SCORE (PRODUCT EVALUATION MAIN) =SUM (INDIVIDUAL SUB QUESTION'S WEIGHTED SCORE)/(SUM (INDIVIDUAL SUB QUESTION'S WEIGHT)*3)*WEIGHT)

WEIGHTED SCORE (PRODUCT EVALUATION DETAILS) =RAW SCORE* WEIGHT OF EACH INDIVIDUAL SUB QUESTION

WEIGHTED (PRODUCT EVALUATION MAIN) =10

WEIGHTED (PRODUCT EVALUATION DETAILS) =INDIVIDUAL SCORE FOR EACH SUB QUESTION

FIG. 5B

INFORMATION TECHNOLOGY ENTERPRISE INTRUSION PREVENTION IMPLEMENTATION TOOL

CROSS-REFERENCE TO RELATED APPLICATION

This application claims priority to U.S. Provisional Patent Application Ser. No. 61/917,427, filed Dec. 18, 2013. The entire content of this application is hereby incorporated by reference herein.

BACKGROUND OF THE INVENTION

The present invention is in the technical field of software application and computer science. More particularly, the present invention is in the technical field of information technology and Internet intrusion prevention software applications.

The Cyber security market place includes many intrusion prevention products from different vendors. Some vendor products are much better than the others in intrusion detection and prevention. Budget and implementation goals are two of the biggest determinants of the selection of one product over the other. The choice of one or another product for monitoring an organization's business systems affect the ability of that organization to realize it's intrusion prevention goal. End User selection of a particular product over the other is often a pain-point due to the complex and varied end-user environmental requirements, product technical complexities and challenging deployment and management issues. In almost all the cases, End-User selection of one or another product is based solely on vendor sales pitches. The information provided by vendors is never based on any objective criteria and should be treated as suspect because the vendors are trying to present their products in the best light. Invariably, the wrong selection of a product will lead to various disastrous consequences including not being able to detect and prevent intrusions and credibility damage from a failed implementation which is very difficult to recover from. Currently, there is a void in the market place of a solution to address the problem.

SUMMARY OF THE INVENTION

The present invention is a software application tool for implementing intrusion prevention devices. The tool is a Software-as-a-Service (SAAS) application on the Web with intelligence built-in used to match user's implementation requirements with the best vendor solution that meets or exceeds the requirements and provides the most value to the user. The invention includes an algorithm that is the business logic automation that computes input feed of user requirements and matches it with a wide range of product characteristics that are tenable under different implementation conditions and then produces a best value result as an output. Thus, through a comparison implementation mechanism, intrusion prevention vendors and buyers seamlessly and interactively engage in requirements matching and solutions evaluation of the most suitable products that delivers the best result for their varied environments and maximizes their return on investment.

An object of the present invention is to provide an application tool to be used by users to select a vendor information technology intrusion prevention product or device that provides the best-value and realizes the set out goals of intrusion prevention in their particular enterprise environment.

A further object of the present invention to provide an implementation tool that eliminates the pain-point associated with end user improper selection of a particular vendor intrusion prevention product over the other.

A further object of the present invention is to provide an application tool that eliminates the disastrous consequences of not being able to detect and prevent intrusions and credibility damage from a failed implementation when the wrong product is used.

A further object of the present invention is to provide a tool that enables users to have increased and wider scope of visibility of vendor product capabilities that enables a better informed choice that results into a positive return on investment and satisfaction of product implementation goal.

These and other objects are achieved in the present invention as illustrated herein.

This invention while filling a market void will ultimately and primarily overcome the negative effects of wrong product selection including the inability to prevent enterprise intrusion. Today's Cyber security market place is full of intrusion prevention products from vendors that are often complex and variable in technology. Currently, users do not have any way of knowing which product is better for their environments as some vendor products are much better than the others in some areas of intrusion prevention for any particular environment. The choice of one or another product for monitoring an organization's business systems affect the ability of that organization to realize its intrusion prevention goals. Budget and implementation goals are two of the biggest determinants of a product selection. End-User selection of a particular product is often a pain-point as a result of the complex and varied end-user environmental requirements, product technical complexities and challenging deployment and management issues. The wrong selection of a product adversely affects the implementation and budget goals. Therefore, this invention fills a market void as it provides a tool that addresses the above problems.

There has thus been outlined, rather broadly, features of the invention in order that the detailed description thereof that follows may be better understood, and in order that the present contribution to the art may be better appreciated. There are, of course, additional features of the invention that will be described further hereinafter. Indeed, it is to be understood that both the foregoing general description and the following detailed description are exemplary and explanatory and are intended to provide further explanation of the invention as claimed.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other decoys for carrying out the several purposes of the present invention. It is important, therefore, that equivalent constructions insofar as they do not depart from the spirit and scope of the present invention, are included in the present invention.

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE INVENTION

The present invention is an intrusion prevention application designed to deliver a web based SAAS platform which enable vendor rating and scoring, product comparison & end user requirement matching. The application consists of a business intelligent engine to assign product scoring, rating, comparison & user requirement matching automatically. The developed application user interface is designed to be responsive & compatible with all platforms and devices including desktop, smart phones & tablets.

Integral to the design is a comparison implementation portal where vendors and buyers seamlessly and interactively engage in requirements matching and solutions acquisition for different user environments.

Figure 1:
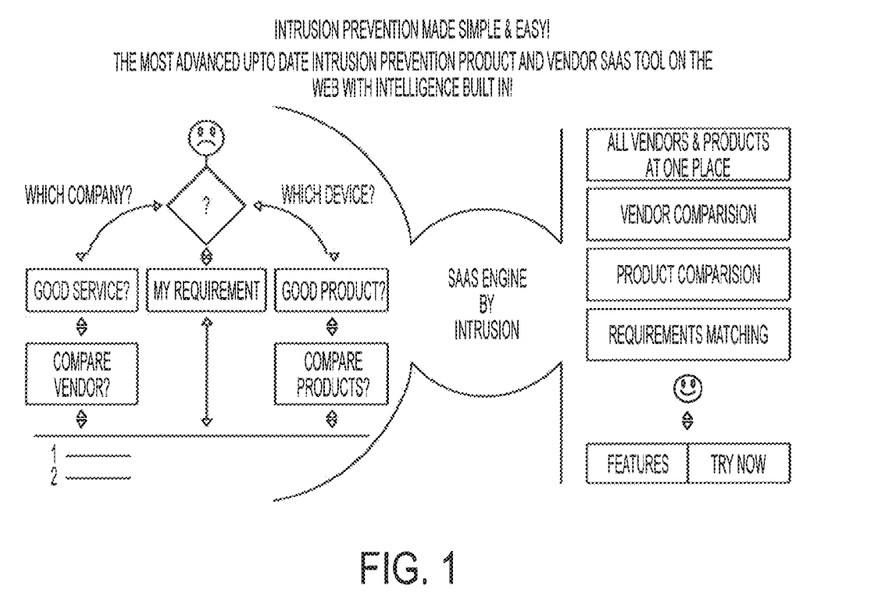
FIG. 1 is a notional design logic view of the tool of the present invention.

Referring now to the invention in more detail, in FIG. 1 there are different design features of the information flow logic, including for example: input feed system via a user interface, business logic automation engine powered by an algorithm; and output system.

The input system consists of user login form used by subscribers for logging into the business logic automation platform to enter user requirements data, and a product and vendor form used by company administrative staff to input product characteristics data and vendor information all of which are parsed to the business logic automation engine where the algorithmic system performs analysis and mathematical computation of the input data and then produces a business intelligence solution that is parsed to the output system. The output system is a reporting module that features a dashboard for graphical and textual output of processed data results which are also transcribable to other output formats.

The company-user-vendor interactive portal architecture provides features including: rich user interface/user experience (UI/UX); subscription and renewal system (shopping cart and payment gateway integration); business intelligence (automatic scoring, rating, comparison, user requirement matching); built in graphs, charts, analytics and reporting system; simple and advanced search; newsletter system; application program interface (API) integrations; alerts and notification system; survey and affiliate program; backend administrative dashboard; rules and workflow system; activity log; and security and analytics system (User and web).

The following describes the exemplary process and design features of the design invention.

Administrative Workflow

The tool's activities are driven by administratively induced activities to support all tool activities including information flow logic. The administrative workflow enables management of vendors and products, scoring and rating engine, user registration to SAAS platform, reports, content management, Graphs, analytics and reports, alert, notifications & email templates, newsletters system, export of data to XLS and CVS, users statistics, log of users activity, feedback and survey results, and other tasks Content Management System (CMS)

The tool has its own CMS database with its own content that allows the administrator to maintain the portal from a backend administrative panel. The CMS provides the ability to maintain content administration and management via a password-protected browser interface.

User Interfaces

The tool provides for several interface subsystems that enables access to the different components including Browsing, Hardware, Software, and Communication Interfaces.

Business Intelligence & Automation Engine

The tool's Algorithmic analysis engine provides business intelligence and automation that is built into the portal for performing activities and actions. Activities/actions can include for example viewing products and users requirements, automatically scoring and rating product based on inputs gathered from users and comparing products based on distinct features. The algorithm of this invention is the procedure and formula for solving the user problem of best problem selection described above. It performs best value mathematical manipulation of the data structured that was designed specifically for the purpose of the invention and produces best value results that are displayed via the output system described in this invention. The data structure for this invention is the ordered method of storing and organizing data that is fed into the system by users, administrators and vendors in such a way that seamlessly fuses it into the algorithm of the invention.

Graphs, Analytics and Reporting System

The graphs, analytics and reporting system is a module that enables the transfer and display of the output of the algorithmic analysis and processing of the provided input materials to users in the form of graphs and documents in different formats.

Search & Advanced Search

The search and advanced module allows subscribed user to search & conduct advanced searching for products and vendors by using key words or phrases and different other criteria.

User Interface

The user interface is a login screen that requires user identification and password input that is transmitted to the subscription module for verification and authentication of users.

Newsletter System

The newsletter system allows users to subscribe to different categories matching to their requirement. It is managed by company administration with standard and customized templates. Users have an option to unsubscribe from the newsletter system. When user account is cancelled form tool's SAAS platform their newsletter account is also unsubscribed from the system.

Alerting, Notification and Email System

This system enables execution of various user, vendor and company correspondence and messaging activities in the SAAS platform including the following:

System for Forms Generation

The tool comes with a system that generates and manages several business process forms including Login Form, Signup Form, Product and Vendor Form, Requirements Form, Survey and Feedback Form, and Newsletter Form.

Integration System

The tool includes and integration module that couples together backend and frontend modules as well as other business and process processing modules such as the Payment Gateway system, CHAT API system, SPHINX or SOLR search system, PHP, MySQL Caching system, Survey and Newsletter system.

Security Requirements

The tool has security module for protection against accidental or malicious access, use, modification, destruction, or disclosure.

Figure 2:
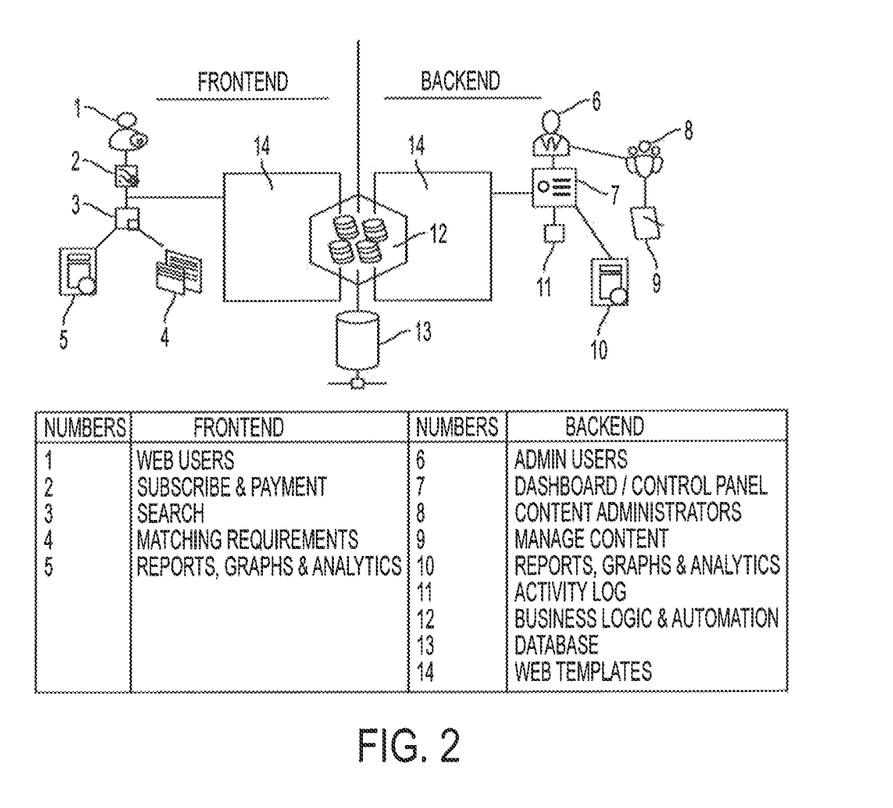
FIG. 2 is the tool's architecture.

Referring now to the invention in more detail, in FIG. 2 there are different design features including for example: Frontend, Backend, Integrations, Administration and Security, Frontend includes for example, User login and Subscription process, Input user requirement, Shopping cart, Payment process, and Account activation.

The following provides further details on the Frontend, Backend, integrations, Administration and Security processes of this invention.

User Login and Subscription Process

The user login and subscription is enabled by the tool's interactive login screen that allows users to create individual accounts and subscribe to one or more of the different subscription options. Once a user is registered, a user name and password is generated that is used to authenticate subsequent logins to the system.

Input User Requirement

The input user requirement is the data and or information that a subscriber specifies as a requirement using the electronic form to be looked up and matched to vendor product features and characteristics. An electronic form that allows paid registered users to input their product requirement, which will be later used to match with products available and listed in the SAAS platform.

Shopping Cart

The shopping cart is an electronic or virtual basket where subscriber's product or item selections are held until the purchase transaction is completed when a payment is made or the transaction is aborted.

Payment Process

Payment for subscriber purchases are initiated upon selection of a product or item to be purchased following which the payment is made through a payment gateway integration to PayPal's merchant's account systems that links to the company's bank account.

Account Activation

Along with subscriber registration, account activation is a subscription sub-process that finally allows the subscriber access to the product purchased per the terms of the contract. Once subscribed, notification is sent to the subscriber via email notification.

User Backend includes for example: user dashboard and logout; a means for managing user profile including password, a means for subscription renewal, a means for account cancellation, a means for ordering and payment, user reports, a means to filter data by vendor and by products, a means of sorting products and/or vendors based on scores, a means to view related products or nearly scored products, a means to view vendors and related or nearly scored similar vendors, a reporting system (graphs, charts etc), a means for simple and advanced search, a means to show products and vendor counts in search results, the ability to compare multiple products, automatic newsletter subscription, the ability to bookmark and save search results, a means to chat with company or Vendor representative (in one embodiment this is facilitated by a vendor providing CHAT API), a means to download a catalogue or brochure, links to related vendors or products, widgets providing for example: total users, total online users, featured products and vendors, testimonials from satisfied users (moderated), alerts and notification when information is updated or modified or removed regarding product or vendor or service, access to survey or feedback form to collect inputs and suggestion from end users, an option to contact the firm if end user needs any consultation regarding the product or vendor, a means to print invoice and export to PDF and/or a means to mail or contact vendor directly if communication details are published along with their products.

The following provides further details on the Backend Survey, Feedback and Notification, processes of the present invention.

Survey and Feedback Form

The survey and feedback form is an electronic form published by company administration to subscribers and used to collect feedback on the tool for future tool enhancements and upgrades.

Newsletter Form

The newsletter form is used for subscribing to the newsletter system in tool's SAAS platform.

Integrations includes for example: payment gateway integration and build contact form API.

The following provide further details on the Payment Gateway Integration and Build Contact Form of this invention.

Payment Gateway Integration

The payment gateway integration is a component of the tool that couples together the company's payment system to PayPal's merchant processing system that serves as an intermediary for monetary transaction between subscribers and the company.

Build Contact Form

The build contact form is an electronic form that is used to receive contact information from the public who require information from the company.

Administration (Admin) includes for example: Admin control panel, Admin dashboard/logout, a means of user management, a means of product and vendor management, a means to upload image/document as desired to support a product, a means to provide changes to scoring and rating engine, a means to save and publish data, a reporting system (Order, Users, Payment, Users status etc), an end user activity log, alerts and notification allowing user to contact vendor, account cancellation, a means for moderation of feedback/testimonials, a workflow system for content publishing from editor to manager or the company way), a means to add manager, editor level users, a means to export data to XLS/CSV, a means to manage all requests generated from end user by the company themselves and facilitate communication between vendor and user, and/or Content management for general pages (about us, FAQ, disclaimer, privacy policy etc.).

The following provide further details on the Administrative (Admin) Control Panel of this invention.

Administrative Control Panel

The admin control panel is the tool's dashboard component that is used to manage the tool's operations, maintenance and other tasks and also used to perform user and subscriber administrative tasks.

Security includes for example: HTTPS, CAPTCHA and virtual keyboard to enter password, Automatic Password expiration, Login screen with (email ID as username, Password, 4/6 digits code to login to account), Forgot password (Email ID and security question needs to be answered), Disable page right click, Complete Security Protection against SQL Injections and/or File/database system caching. [As above—need a description for each of these elements]

The following provide further details on the Security process of this invention.

Security

To maintain privacy and confidentiality of the business and operational process, the tool includes a security component that provides security to users, subscribers, business and operational process transactions.

Figure 3:
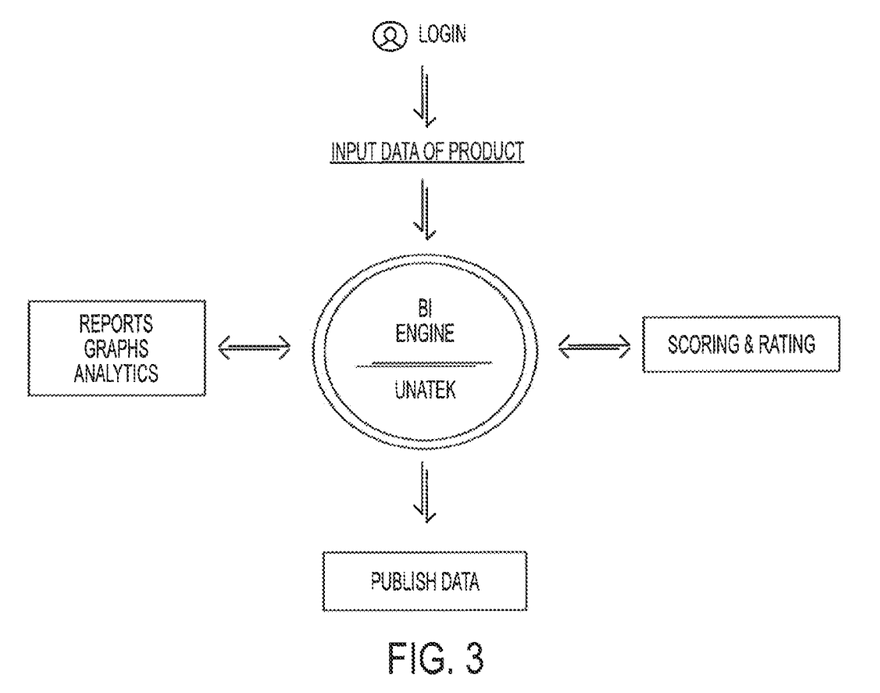
FIG. 3 is a data model view of the tool.
Figure 4:
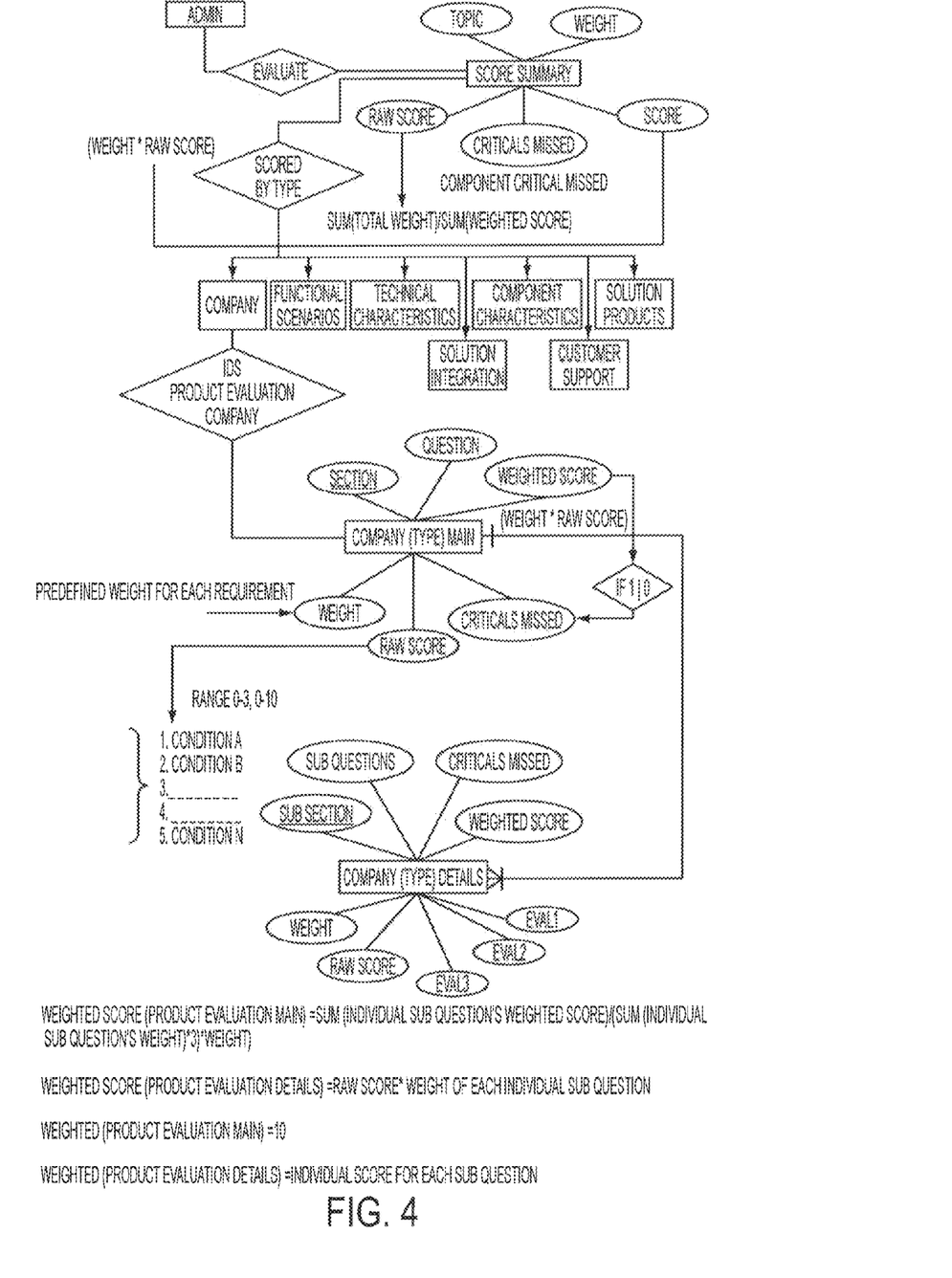
FIG. 4 depicts a requirement matching and scoring algorithm of the tool.
Figure 5A:
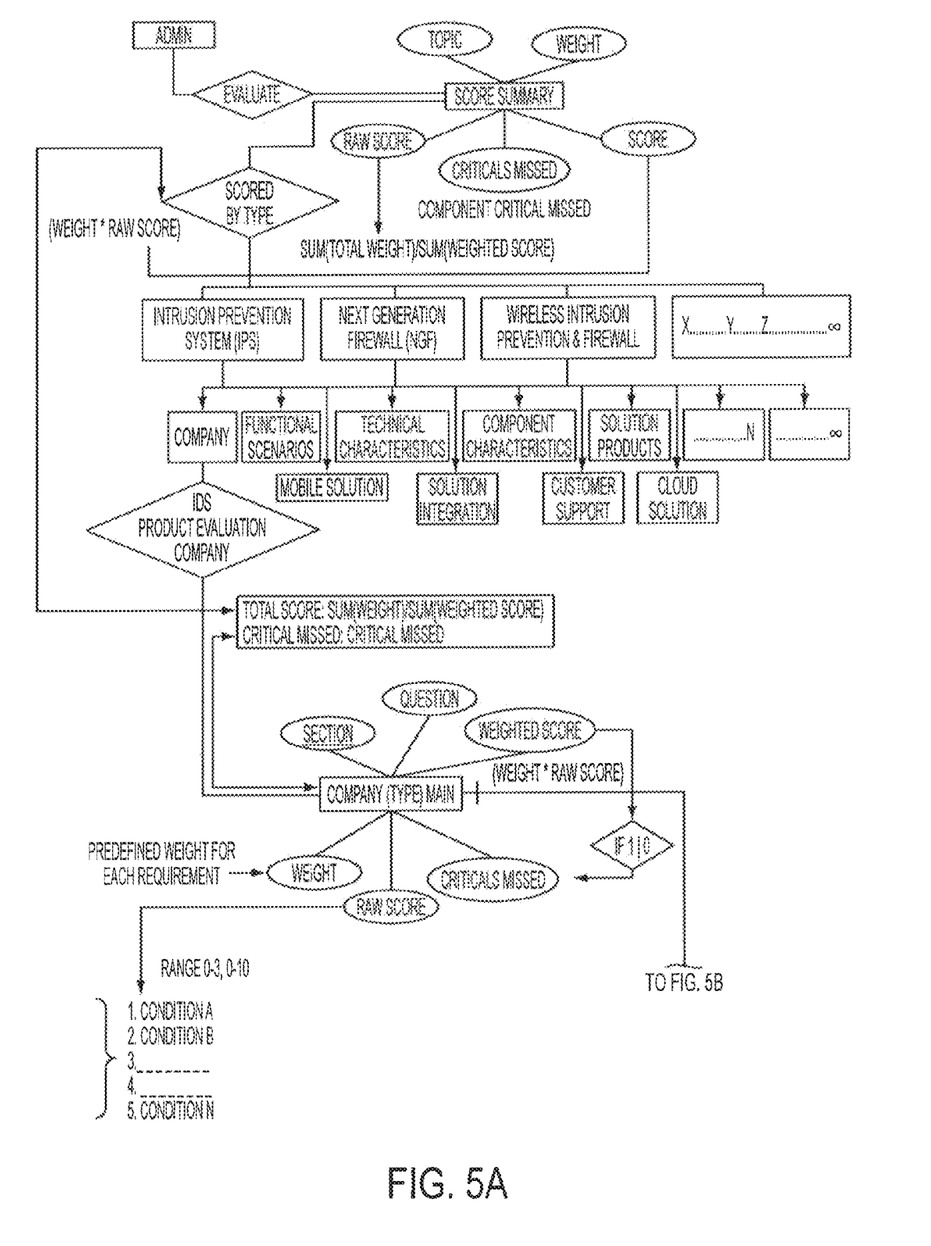
FIG. 5A and FIG. 5B depict a requirement matching and scoring algorithm of the tool.
Figure 5B:
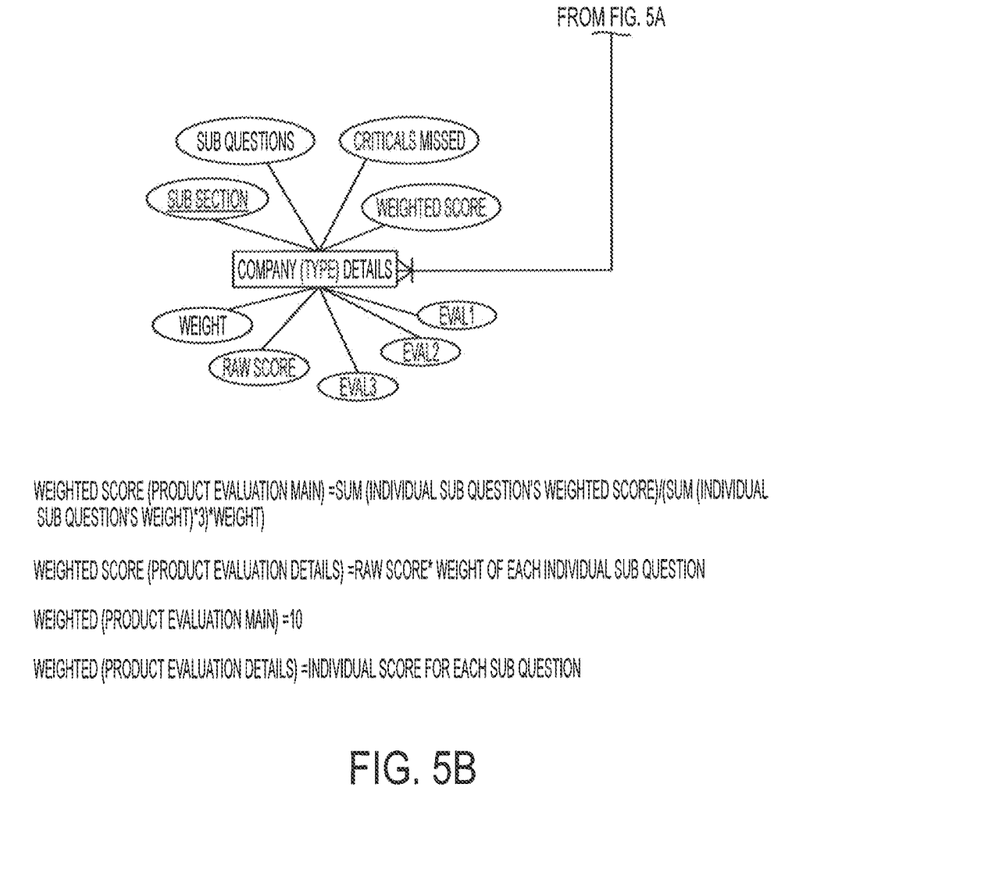

In further detail, decision making SAAS (BI) engine as illustrated in FIG. 1, FIG. 2 and FIG. 3, is powered by the algorithm of FIG. 4 or FIG. 5. The algorithm performs mathematical computations of input feed and produces results that are generated as reports.

The algorithm details of an embodiment of the invention are shown in FIGS. 4 and 5 and include a set of integral mathematical formulae reflecting and derived from an information flow as a logic engine.

The Cyber security market place is full of IPS/FW products from different vendors, with some vendor products being better than the others in some areas of intrusion prevention: The present invention is portable and provides benefit for example, by: filling the void of intrusion selection tool in the market place; reducing the pain-point associated with end user selection of a particular product over the other; reducing the likelihood of disastrous consequences including not being able to detect and prevent intrusions and credibility damage from a failed implementation; and enhances ability to meet budget and implementation goals, two of the primary determinants of the selection of one product over the other.

In a broad embodiment, the present invention is an implementation tool that fills a void in the Cyber security industry and market place.

Having now described a few embodiments and aspects of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, because numerous modifications will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A Web-based, computer-implemented method for evaluating the suitability of intrusion prevention systems for a particular user, the Web-based, computer-implemented method comprising:
   obtaining a set of user implementation requirements;
   obtaining weights representing the relative importance of a plurality of attributes related to intrusion prevention systems;
   obtaining a plurality of attribute scores for each of the plurality of attributes related to a plurality of intrusion prevention systems;
   determining a weighted sum of the plurality of attribute scores based on the weights by summing a plurality of products of each of the plurality of attribute scores times the associated weight for the attribute; and
   providing a report regarding suitability of the plurality of intrusion prevention systems for the particular user based on the weighted sum of the plurality of attribute scores based on the weights, wherein the report includes one or more graphs.

\* \* \* \* \*